United States Patent
Pirtle et al.

(10) Patent No.: US 8,266,171 B2
(45) Date of Patent: Sep. 11, 2012

(54) PRODUCT FIX-EFFECTIVENESS TRACKING AND NOTIFICATION SYSTEM AND METHOD

(75) Inventors: Randall Pirtle, Tempe, AZ (US); Prakash Subramonian, Bangalore (IN); Nitesh Lall, Bangalore (IN); Sandeep Baliga, Bangalore (IN); Amarnath Subrahmanya, Bangalore (IN); Somesh Subramani, Bangalore (IN); Ramji Sethu, Coimbatore (IN); Edward Kuzia, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 298 days.

(21) Appl. No.: 12/483,081

(22) Filed: Jun. 11, 2009

(65) Prior Publication Data

US 2010/0318553 A1    Dec. 16, 2010

(51) Int. Cl.
*G06F 17/30* (2006.01)
(52) U.S. Cl. ............... 707/769; 707/708; 707/949
(58) Field of Classification Search .......... 707/738, 707/740, 758, 944, 948, 949, 708, 769
See application file for complete search history.

(56) References Cited

U.S. PATENT DOCUMENTS

| | | | |
|---|---|---|---|
| 5,822,218 A | 10/1998 | Moosa et al. | |
| 5,931,877 A * | 8/1999 | Smith et al. | 701/29 |
| 6,292,806 B1 | 9/2001 | Sandifer | 705/26.1 |
| 6,338,045 B1 * | 1/2002 | Pappas | 705/29 |
| 6,408,258 B1 | 6/2002 | Richer | |
| 6,487,479 B1 * | 11/2002 | Nelson | 701/29 |
| 6,567,729 B2 * | 5/2003 | Betters et al. | 701/29 |
| 6,684,349 B2 * | 1/2004 | Gullo et al. | 714/47.2 |
| 6,799,154 B1 | 9/2004 | Aragones et al. | |
| 6,804,589 B2 | 10/2004 | Foxford et al. | |
| 6,816,798 B2 | 11/2004 | Pena-Nieves et al. | |
| 6,832,205 B1 | 12/2004 | Aragones et al. | |
| 6,901,377 B1 * | 5/2005 | Rosenfeld et al. | 705/26.35 |
| 6,909,994 B2 * | 6/2005 | Johnson et al. | 702/185 |
| 7,107,491 B2 | 9/2006 | Graichen et al. | |
| 7,113,838 B2 | 9/2006 | Funk et al. | |
| 7,197,430 B2 * | 3/2007 | Jacques et al. | 702/184 |
| 7,359,777 B2 * | 4/2008 | Betters et al. | 701/35 |
| 7,373,559 B2 | 5/2008 | Guha | |
| 7,401,263 B2 | 7/2008 | Dubois, Jr. et al. | |

(Continued)

OTHER PUBLICATIONS

European Patent Office "Supplementary European Search Report," dated Sep. 6, 2010; Application No. 10165025.7-1238, filed Jun. 4, 2010.

(Continued)

*Primary Examiner* — John E Breene
*Assistant Examiner* — Evan Aspinwall
(74) *Attorney, Agent, or Firm* — Ingrassia Fisher & Lorenz, P.C.

(57) ABSTRACT

Methods and apparatus are provided for tracking the effectiveness of a modification that has been installed into a product in response to an issued modification notice. A product removal database having removal data stored therein that are associated with one or more products is periodically accessed at a user-specified periodicity. One or more user-selected fix-effectiveness algorithms are executed to determine if at least a portion of the periodically accessed removal data matches one or more user-specified keywords that correlate to the modification. If it is determined that at least a portion of the periodically accessed removal data matches the one or more user-specified keywords, then an alert is transmitted to a preset destination.

8 Claims, 13 Drawing Sheets

U.S. PATENT DOCUMENTS

| | | | |
|---|---|---|---|
| 7,440,906 B1* | 10/2008 | Wetzer et al. | 705/7.12 |
| 7,502,787 B2* | 3/2009 | Bailey et al. | 1/1 |
| 7,548,802 B2* | 6/2009 | Avery et al. | 701/35 |
| 7,689,329 B2* | 3/2010 | Avery et al. | 701/14 |
| 7,715,943 B2* | 5/2010 | Loda | 700/229 |
| 7,761,201 B2* | 7/2010 | Avery et al. | 701/29 |
| 2001/0032103 A1* | 10/2001 | Sinex | 705/4 |
| 2002/0010532 A1* | 1/2002 | Sinex | 701/29 |
| 2002/0078403 A1 | 6/2002 | Gullo et al. | |
| 2002/0138311 A1* | 9/2002 | Sinex | 705/4 |
| 2002/0143445 A1* | 10/2002 | Sinex | 701/29 |
| 2003/0033260 A1* | 2/2003 | Yashiro et al. | 705/400 |
| 2003/0055812 A1 | 3/2003 | Williams et al. | |
| 2003/0061104 A1* | 3/2003 | Thomson et al. | 705/26 |
| 2003/0069659 A1* | 4/2003 | Wada et al. | 700/108 |
| 2003/0084019 A1* | 5/2003 | Woodmansee | 707/1 |
| 2003/0149548 A1* | 8/2003 | Mosses et al. | 702/184 |
| 2004/0117051 A1 | 6/2004 | Ford | |
| 2004/0123179 A1 | 6/2004 | Dragomir-Daescu et al. | |
| 2004/0172573 A1 | 9/2004 | Babu et al. | |
| 2005/0102571 A1* | 5/2005 | Peng et al. | 714/26 |
| 2005/0171732 A1 | 8/2005 | Williams et al. | |
| 2007/0010923 A1* | 1/2007 | Rouyre | 701/29 |
| 2007/0112486 A1* | 5/2007 | Avery et al. | 701/35 |
| 2007/0192078 A1 | 8/2007 | Nasle et al. | |
| 2007/0214159 A1* | 9/2007 | Lawson et al. | 707/101 |
| 2008/0021604 A1 | 1/2008 | Bouvier et al. | |
| 2008/0059340 A1 | 3/2008 | McCaherty et al. | |
| 2008/0103788 A1 | 5/2008 | Morris et al. | |
| 2008/0249828 A1* | 10/2008 | MacAuley et al. | 705/9 |
| 2009/0222427 A1* | 9/2009 | Malkowicz et al. | 707/4 |
| 2009/0234616 A1* | 9/2009 | Perkins | 702/184 |
| 2009/0281867 A1 | 11/2009 | Sievenpiper et al. | |
| 2009/0312897 A1* | 12/2009 | Jamrosz et al. | 701/29 |
| 2010/0121520 A1* | 5/2010 | Yukawa et al. | 701/29 |
| 2010/0153448 A1* | 6/2010 | Harpur et al. | 707/779 |

OTHER PUBLICATIONS

European Patent Office "Statement in Accordance with the Notice from the European Patent Office dated Oct. 1, 2007, Concerning Business Methods—EPC / Erklaerung Gemaess Der Mitteilung Des Europaeischen Patentamts Vom Okt. 1, 2007 Ueber eschaeftsmethoden—EPU / Declaration Conformement Au Communique De L'Office Europ"; 20071101, Nov. 1, 2007, XP007905525.

USPTO Office Action dated Jan. 24, 2011 for U.S. Appl. No. 12/254,668.

EP Search Report dated Aug. 1, 2010, 09173186.9-2221 citing notice of the President in 0J2007/11, the content of the search opinion.

Kuzia E. Jr., et al.; Proactive Reliability Tracking, A Progress Report, Honeywell International & MIS Dept. University of Arizona.

Focusing on Safety, Reliability, Maintenance, and Cost Effectiveness in Today's Environment, The Civil Aviation Safety Symposium, Sep. 7-9, 2004, Dallas, Texas.

Kuzia E. Jr.; Civil Aviation Safety Symposium Proactive Reliability Tracking, Sep. 2004, pp. 1-27.

European Patent Office "EP Search Report," dated Apr. 16, 2010; Application No. 10151850.4-1238, filed Jan. 27, 2010.

Irene Eusgeld et al. "Hardware Reliability," Oct. 5, 2005, Dependability Metrics; [Lecture Notes in Computer Science], Springer Berlin Heidelberg, Berlin, Heidelberg, pp. 59-103, XP019076322; ISBN: 9783540689461.

USPTO Office Action for U.S. Appl. No. 12/254,668 with a Notification date of Aug. 5, 2011.

Weibull.com (Crow-AMSAA, Aug. 10, 2007) retrieved from http://web.archive.org.

USPTO Office Action for U.S. Appl. No. 12/366,401; Notification dated Oct. 12, 2011.

* cited by examiner

FIG. 11

| | A | B | C |
|---|---|---|---|
| 2 | | SB DETAILS | SB IMPLEMENTED FOR A NEW SOLENOID |
| 4 | | SB DATE - RO | 01-SEP-02 |
| 6 | | SB DATE - PRODUCTION | 01-DEC-02 |

FIG. 12

| | A | B | C | D | E | F | G | H | I | J |
|---|---|---|---|---|---|---|---|---|---|---|
| 1 | PART_NUMBER | SERIAL_NUMBER | SHIP_DATE | CUST_CODE | SO_NUMBER | SO_ITEM | INVOICE | WEIGHT | QTY_SHIPPED | SN FLAGGED? |
| 2 | 109612-3 | 1602 | 1/31/1996 | GED | T302901 | 001 | 015783 | 0 | 2 | NO |
| 3 | 109612-3 | 1603 | 1/31/1996 | GED | T302901 | 001 | 015783 | 0 | 2 | NO |
| 4 | 109612-3 | 1604 | 2/29/1996 | GED | T302901 | 001 | 018211 | 0 | 2 | NO |
| 5 | 109612-3 | 1605 | 2/29/1996 | GED | T302901 | 001 | 018211 | 0 | 2 | NO |
| 6 | 109612-3 | 1606 | 4/4/1996 | GED | T302901 | 001 | 021413 | 0 | 2 | NO |
| 7 | 109612-3 | 1607 | 4/4/1996 | GED | T302901 | 001 | 021413 | 0 | 2 | NO |
| 8 | 109612-3 | 1608 | 5/14/1996 | GED | T302901 | 001 | 024304 | 0 | 2 | NO |
| 9 | 109612-3 | 1609 | 5/14/1996 | GED | T302901 | 001 | 024304 | 0 | 2 | NO |
| 10 | 109612-3 | 1610 | 7/3/1996 | GED | T302901 | 001 | 029488 | 0 | 3 | NO |
| 11 | 109612-3 | 1611 | 7/3/1996 | GED | T302901 | 001 | 029488 | 0 | 3 | NO |
| 12 | 109612-3 | 1612 | 7/3/1996 | GED | T302901 | 001 | 029488 | 0 | 3 | NO |
| 13 | 109612-3 | 1613 | 7/18/1996 | GED | T302901 | 001 | 030324 | 0 | 2 | NO |
| 14 | 109612-3 | 1614 | 7/18/1996 | GED | T302901 | 001 | 030324 | 0 | 2 | NO |
| 15 | 109612-3 | 1615 | 8/21/1996 | GED | T302901 | 001 | 030688 | 0 | 1 | NO |
| 16 | 109612-3 | 1616 | 7/31/1996 | GGA | T305801 | 001 | 031985 | 0 | 1 | NO |
| 17 | 109612-3 | 1617 | 8/19/1996 | GGA | T305801 | 001 | 033424 | 0 | 1 | NO |
| 18 | 109612-3 | 1618 | 8/19/1996 | GED | T302901 | 001 | 033423 | 0 | 1 | NO |
| 19 | 109612-3 | 1619 | 9/16/1996 | GED | T303463 | 001 | 035343 | 0 | 3 | NO |
| 20 | 109612-3 | 1620 | 10/12/1996 | GED | T303463 | 001 | 037988 | 0 | 3 | NO |
| 21 | 109612-3 | 1621 | 10/12/1996 | GED | T303463 | 001 | 037988 | 0 | 3 | NO |
| 22 | 109612-3 | 1622 | 10/12/1996 | GED | T303463 | 001 | 037988 | 0 | 3 | NO |
| 23 | 109612-3 | 1623 | 10/25/1996 | GED | T303463 | 001 | 039038 | 0 | 1 | NO |
| 24 | 109612-3 | 1624 | 12/21/1996 | ASD | T992242 | 001 | 043911 | 0 | 1 | NO |
| 25 | 109612-3 | 1625 | 12/16/1996 | ASD | T992241 | 001 | 043468 | 0 | 1 | NO |
| 26 | 109612-3 | 1626 | 4/17/1997 | GED | T303463 | 001 | TA9258 | 0 | 3 | NO |
| 27 | 109612-3 | 1627 | 4/17/1997 | GED | T303463 | 001 | TA9258 | 0 | 3 | NO |
| 28 | 109612-3 | 1628 | 4/17/1997 | GED | T303463 | 001 | TA9258 | 0 | 3 | NO |
| 29 | 109612-3 | 1629 | 5/15/1997 | GED | T303463 | 001 | TB2108 | 0 | 2 | NO |
| 30 | 109612-3 | 1630 | 5/15/1997 | GED | T303463 | 001 | TB2108 | 0 | 2 | NO |

FIG. 13

| | RFR_DESC |
|---|---|
| 1 | RFR_DESC |
| 2 | EST.WARR.REPAIR.LEAKING. C/W P/S M-49-50-03 DTD 11-26-03 SOV 0.01 AG LEAKING |
| 3 | EST.WRNTY RPR. S.O. VALUE 0.01. SS C-W POLICY SHEET M-49-50-03 DATED 26NOV2003 @HTTP://VENDORS.FEDEX.COM ON AFTER START PNEUMATIC LEAK DOWN CHECK. #2 PACK |
| 4 | EST.WARR.REPAIR SOV 0.01 AG C-W POLICY SHEET M-49-50-03 DATED 26NOV2003 @HTTP://VENDORS.FEDEX.COM LEAKING INTERNALLY |
| 5 | EST WRNTY REPAIR. SO VALUE 0.01. TP C-W POLICY SHEET M-49-50-03 DATED 26NOV2003 @HTTP://VENDORS.FEDEX.COM REMOVED AS PER NR F147195-N1195 LEAK |
| 6 | REPAIR. SO VALUE 3710.00. TP C-W POLICY SHEET M-49-50-03 DATED 26NOV2003 @HTTP://VENDORS.FEDEX.COM VALVE LEAKING |
| 7 | REPAIR. SO VALUE 3710.00. TP C-W POLICY SHEET M-49-50-03 DATED 26NOV2003 @HTTP://VENDORS.FEDEX.COM WHILE T-S, FOUND PSC #2 NOT PASSING RTS TEST. APU LOAD BLE |
| 8 | EST WRNTY REPAIR. S.O. VALUE 0.01. LC C-W POLICY SHEET M-49-50-03 DATED 26-NOV-2003 @HTTP://VENDORS.FEDEX.COM LEAKING |
| 9 | EST WRNTY REPAIR. S.O. VALUE 0.01. LC C-W POLICY SHEET M-49-50-03 DATED 26-NOV-2003 @HTTP://VENDORS.FEDEX.COM LOAD VALVE LEAKING |
| 10 | ESTIMATE WRTY REPAIR, SR$0.01 AH C-W POLICY SHEET M-49-50-03 DATED 26NOV2003 @HTTP://VENDORS.FEDEX.COM VALVE LEAKING INTERNALLY |
| 11 | EST WRNTY REPAIR.LEAKS.SO. VALUE 0.01 C-W POLICY SHEET M-49-50-03 DATED 26NOV2003 @HTTP://VENDORS.FEDEX.COM |
| 12 | EST. WARRANTY REPAIR TOTAL S/O VALUE - 0.01. RM C-W POLICY SHEET M-49-50-03 DATED 26NOV2003 @HTTP://VENDORS.FEDEX.COM INTERNAL LEAK |
| 13 | REP.,S/O VALUE-3784.00.TC C-W POLICY SHEET M-49-50-03 DATED 26NOV2003 @HTTP://VENDORS.FEDEX.COM APU VERY WEAK OR AIR SYSTEM HAS LEAKS ON THE GROUND BLEED |
| 14 | EST WARRANTY REPAIR. TOTAL S/O VALUE - 0.01. RFR: VALVE FOUND LEAKING. VENDOR INSTR: C/W POLICY SHEET M-49-50-03 DATED 26NOV2003 @HTTP://VENDORS.FEDEX.COM |
| 15 | EST WARRANTY REPAIR. TOTAL S/O VALUE .0.01. RM C-W POLICY SHEET M-49-50-03 DATED 26NOV2003 @HTTP://VENDORS.FEDEX.COM LEAKING |
| 16 | REPAIR. TOTAL S/O VALUE - 3860.00. RM C-W POLICY SHEET M-49-50-03 DATED 26NOV2003 @HTTP://VENDORS.FEDEX.COM VALVE LEAKING |
| 17 | REPAIR. TOTAL S/O VALUE - 3860.00. RM C-W POLICY SHEET M-49-50-03 DATED 26NOV2003 @HTTP://VENDORS.FEDEX.COM FOUND LEAKING |

| | CTC_DESC1 |
|---|---|
| 1 | CTC DESC1 |
| 2 | REPAIRED & TESTED PER COMPONENT MAINTENANCE MANUAL (REPLACED WITH NEW SWITCH ASS'Y, RELIEF VALVE, BEARINGS, SEALS, TUBE, CONNECTING ROD, PACKINGS: REW |
| 3 | UNIT WAS DISASSEMBLED, CLEANED, REPAIRED AND TESTED PER CMM. SEE CHECKSHEET FOR ALL PARTS REPLACED. SOLENOID PINS VERY CORRODED, INTERNALLY CONTAMINA |
| 4 | DISASSEMBLED AS NECESSARY TO REWORK DEFECTIVE SOLENOID AND PERFORM FIELD MAINTENANCE THRESHOLD REQUIREMENTS PER POLICY SHEET M-49-50-03, INSPECTED |
| 5 | UNIT DISASSEMBLED 100% TO CLEAN, INSPECT AND REPLACE PARTS AS NEEDED TO RETURN BACK TO SERVICE. REPLACED BINDING BEARINGS, TORN SEALS,GROOVED/LEAKING |
| 6 | UNIT WAS DISASSEMBLED, CLEANED, OVERHAULED AND TESTED PER CMM. SETSCREW AND TUBE BENT AS RECEIVED. SEE CHECKSHEET FOR ALL PARTS REPLACED. UNIT OVERH |
| 7 | UNIT IS BELOW SCHEDULED THRESHOLD MAINTENANCE REQUIREMENTS HOURS, BUT DUE TO THE EXTENT OF EXTERNAL DAMAGE TO THE ACTUATOR HOUSING THE UNIT WAS DIS |
| 8 | UNIT DISASSEMBLED 100% TO CLEAN, INSPECT AND REPLACE PARTS AS NEEDED TO RETURN BACK TO SERVICE. REPLACED RUSTED/BINDING BEARINGS, GROOVED SEATS, TORN |
| 9 | UNIT DISASSEMBLED 100% TO CLEAN, INSPECT AND REPLACE PARTS AS NEEDED TO RETURN BACK TO SERVICE. REPLACED RUSTED/BINDING BEARINGS, GROOVED SEATS, TORN |
| 10 | UNIT FAILED FOR SOLENOID RESISTANCE VERY ERRATIC. REWORKED SOLENOID AND CLEANED UNIT TO RETURN UNIT TO SERVICE |
| 11 | REPLACED DEFECTIVE SOLENOID ASSEMBLY, REASSEMBLED TO RETURN BACK TO SERVICEABLE CONDITION.SOLENOID FAILS RESISTANCE CHACK/MUST BE 30 TO 50 ohms/ ACTU |
| 12 | UNIT HAD HEAVY EXTERNAL CONTAMINATION AND SOLENOID WAS STICKING. REWORKED SOLENOID AND REPLACED SEATS. CLEANED UNIT AS WELL AS POSSIBLE WITHOUT DISAS |
| 13 | DISASSEMBLED UNIT COMPLETELY TO CLEAN AND INSPECT ALL PARTS FOR NORMAL OPERATIONAL WEAR OR OTHER DAMAGE. REWORKED WORN ACTUATOR DIAPHRAGM AND IN |
| 14 | UNIT WAS DISASSEMBLED TO EXTENT OF REPAIR, CLEANED, REPAIRED AND TESTED PER CMM. BALL WAS STICKING UNDER SOLENOID CAUSING EXCESSIVE LEAKAGE. NO DAMAGE |
| 15 | PRIMARY CAUSE FOR FAILURE WAS DUE TO THE SOLENOID LEAKING EXCESSIVELY. UNIT WAS DISASSEMBLED 100% TO CLEAN AND INSPECT ALL PARTS FOR WEAR. REWORKED S |
| 16 | DISASSEMBLED TO CLEAN AND INSPECT PARTS FOR COMPLIANCE TO THE OVERHAUL WORK SCOPE. REWORKED/REPLACED ALL WORN PARTS PER CMM AND POLICY SHEET. UNIT |
| 17 | DISASSEMBLED TO CLEAN AND INSPECT PARTS FOR COMPLIANCE TO THE OVERHAUL WORK SCOPE. REWORKED/REPLACED ALL WORN PARTS PER CMM AND POLICY SHEET. UNIT |
| 18 | UNIT WAS DISASSEMBLED, CLEANED, REPAIRED AND TESTED PER CMM. REWORKED SOLENOID, REPLACED SEAT AND WASHERS AS PRECAUTIONARY MEASURE |
| 19 | UNIT DISASSEMBLED 100% TO CLEAN, INSPECT PARTS TO REPAIR UNIT PER CMM TO RETURN TO SERVICE. REPLACED GROOVED AND LEAKING SEATS,LEAKING AND TORN S |
| 20 | UNIT DISASSEMBLED 100% TO CLEAN, INSPECT PARTS TO REPAIR UNIT PER CMM TO RETURN TO SERVICE. REPLACED GROOVED AND LEAKING SEATS,LEAKING AND TORN S |
| 21 | UNIT DISASSEMBLED 100% TO CLEAN, INSPECT PARTS TO REPAIR UNIT PER CMM TO RETURN TO SERVICE. REPLACED GROOVED AND LEAKING SEATS,LEAKING AND TORN S |
| 22 | UNIT DISASSEMBLED 100% TO CLEAN, INSPECT PARTS TO REPAIR UNIT PER CMM TO RETURN TO SERVICE. REPLACED GROOVED AND LEAKING SEATS,LEAKING AND TORN S |
| 23 | UNIT DISASSEMBLED 100% TO CLEAN, INSPECT PARTS TO REPAIR UNIT PER CMM TO RETURN TO SERVICE. REPLACED GROOVED AND LEAKING SEATS,LEAKING AND TORN S |
| 24 | UNIT DISASSEMBLED 100% TO CLEAN AND INSPECT PARTS TO REPAIR UNIT PER CMM TO RETURN TO SERVICE. REWORKED DIAPHRAGM AND SOLENOID. REPLACED ALL WORN PA |
| 25 | UNIT DISASSEMBLED 100% TO CLEAN AND INSPECT PARTS TO REPAIR UNIT PER CMM TO RETURN TO SERVICE. REWORKED DIAPHRAGM AND SOLENOID. REPLACED ALL WORN PA |
| 26 | UNIT DISASSEMBLED 100% TO CLEAN AND INSPECT PARTS TO REPAIR UNIT PER CMM TO RETURN TO SERVICE. REWORKED DIAPHRAGM AND SOLENOID. REPLACED ALL WORN PA |
| 27 | DISASSEMBLED UNIT 100% TO CLEAN AND INSPECT PARTS TO OVERHAUL UNIT PER CMM TO RETURN TO SERVICE. OVERHAULED DUE TO TSHM HOURS ---3566:13. REWORKED SOL |
| 28 | DISASSEMBLED UNIT 100% TO CLEAN AND INSPECT PARTS TO OVERHAUL UNIT PER CMM TO RETURN TO SERVICE. OVERHAULED DUE TO TSHM HOURS ---3566:13. REWORKED SOL |
| 29 | DISASSEMBLED TO CLEAN, INSPECT AND REPLACE PARTS AS NEEDED TO RETURN BACK TO SERVICE. REPLACED NICKED SEATS AND ALL RELATED PACKINGS. REWORKED DEFEC |
| 30 | UNIT DISASSEMBLED AS NECESSARY TO CHECK SOLENOID, SEATS, AND BALL. PARTS REPLACED AS NECESSARY TO REPAIR PER MFG MANUAL |

| | N | O | P | Q |
|---|---|---|---|---|
| 1 | RFR_DESC | WST_DESC | CAR_DESC | NVT_DESC ES |
| 2 | EST.WARR REPAIR APU FAULT AFTER APU STARTED | | UNIT RECEIVED EXTERNALLY DIRTY AND INTERNAL CO | |
| 3 | EST. REPAIR MTSI C/W P/S M-49-50-03 DTD 9/21/01 SOV | | UNIT RECEIVED CONTAMINATED WITH CARBON SOOT. | |
| 4 | ESTIMATE REPAIR, C/W P/S M-49-50-03 DTD 9-21-01, BL | | (BEARINGS CONTAMINATED WITH GREASY BLACK SOO | |
| 5 | EST.WARR.REPAIR. APU LOAD BLEED VALVE SHOWS C | | UNIT RECEIVED CONTAMINATED WITH CARBON SOOT. | |
| 6 | EST. REPAIR PER OEM SPECS. AG | | CONTAMINATED/BODY OUT OF ROUND | |
| 7 | ESTIMATE WRTY REPAIR; C/W P/S M-49-50-03 DATE 5/9/ | | CONTAMINATED/ACTUATOR HOUSING BROKEN (PICTU | |
| 8 | ESTIMATE WRTY REPAIR,C/W P/S M-49-50-03 DTD 5-9-0 | | CONTAMINATED/BODY BEARING BORE WORN | |
| 9 | ESTIMATE REPAIR, C/W P/S M-49-50-03 DTD 07/11/03,PA | | UNIT REC'D WITH SEALS CREASED AND LEAKING BEAR | |
| 10 | EST.WARR.REPAIR. DURING ENG START LEVEL 1 STAR | | UNIT RECEIVED CONTAMINATED INTERNALLY/EXTERN | |
| 11 | EST.WARR.REPAIR. APU LOAD VLV SOLENOID FAULTE | | INTERNAL SOLENOID LEAKAGE, SCORED SEATS | |
| 12 | EST.WARR REPAIR. 53 MINUTES INTO FLIGHT 'AIR SYS | | CONTAMINATED /SHAFT GROOVED/PIN DISTORTED/UN | |
| 13 | ESTIMATE WRTY REPAIR, C/W P/S M-49-50-03 DTD 11JU | | UNIT RECEIVED WITH SWITCH INTERMITTANT, RELIEF | |
| 14 | EST WARR REPAIR, ON POST FLT C'K FOUND APU LOA | | RECEIVED WITH SOOT IN FLOWBORE | |
| 15 | EST WARR REPAIR, DURING SVC CHK FOUND APU BLE | | | |
| 16 | EST OVERHAUL, APU FOUND BLEED AIR PRESSURE LO | UNIT WAS DISASSEMBLED 100% TO CLEAN, INSPECT A | UNIT RECEIVED WITH HEAVY CARBON CONTAMINATIO | |
| 17 | EST REPAIR. C/W P/S M-49-50-03, DTD 26NOV2003. APU | UNIT DISASSEMBLED 100% TO CLEAN, INSPECT AND R | UNIT RECEIVED WITH NON-DETRIMENTAL NICKS SCRA | |
| 18 | EST REPAIR, APU BLEED AIR SYS, C/W P/S M-49-50-03 | UNIT DISASSEMBLED 100% TO CLEAN, INSPECT AND R | UNIT RECEIVED WITH NON-DETRIMENTAL NICKS SCRA | |
| 19 | EST WARRANTY REPAIR, APU LOAD BLEED VLV DISAGI | UNIT DISASSEMBLED 100% TO CLEAN, INSPECT AND R | UNIT RECEIVED WITH NON-DETRIMENTAL NICKS SCRA | |
| 20 | EST.WARR.REPAIR.LEAKING. C/W P/S M-49-50-03 DTD 1 | UNIT DISASSEMBLED TO CLEAN, INSPECT AND REPLA | UNIT RECEIVED WITH NON-DETRIMENTAL NICKS AND S | |
| 21 | EST WARR REPAIR AFTER BLOCK IN NOTED APU FAUL | DISASSEMBLED COMPLETELY, CLEANED INSPECTED A | LIGHT CARBON CONTAMINATION AND NON-DETRIMENT | |
| 22 | EST WARR REPAIR UPON COMPLETION OF AFTER LAN | UNIT WAS DISASSEMBLED, CLEANED, REPAIRED AND T | UNIT RECEIVED INTERNALLY CONTAMINATED | |
| 23 | EST WRTY REPAIR APU PNEU FUNCTION INOP C/W P/S | PRIMARY CAUSE OF FAILURE WAS DUE TO SPRING BR | NICKS AND DENTS THROUGHOUT WHICH ARE NOT DE | |
| 24 | EST REPAIR C/W P/S M-49-50-03, DTD 26NOV2003. ENR( | PRIMARY CAUSE OF FAILURE WAS DUE TO EXCESSIVE | NICKS AND DENTS THROUGHOUT WHICH ARE NOT DE | |
| 25 | REPAIR SO VALUE 3451 00. SS ROUTINE REPLACEMEN | UNIT WAS DISASSEMBLED 100% TO CLEAN AND INSPE | (UNIT RECEIVED WITH MINOR NICKS, DENTS, AND SCR | |
| 26 | EST WRNTY RPR. S.O. VALUE 0.01. SS C-W POLICY SHI | UNIT DISASSEMBLED TO CLEAN, INSPECT AND REPLA | UNIT RECEIVED WITH HEAVY CARBON/CORROSION IN | |
| 27 | EST WRNTY FUNCTION TEST AND ADVISE REP OR OVH | DISASSEMBLED TO CLEAN, INSPECT AND REPLACE PA | UNIT RECEIVED WITH NON-DETRIMENTAL NICKS AND S | |
| 28 | WRNTY REPAIR SO VALUE 0.01 TP C-W POLICY SHEET | DISASSEMBLED TO CLEAN, INSPECT AND REPLACE PA | UNIT RECEIVED WITH NON-DETRIMENTAL NICKS AND S | |
| 29 | ESTIMATE WARRANTY REPAIR S.O. VALUE 0.01 SS C-\ | UNIT DISASSEMBLED 100% TO CLEAN, INSPECT AND R | UNIT RECEIVED WITH NON-DETRIMENTAL NICKS AND S | |
| 30 | EST.WARR FUNCT TEST ADVISE TO RP OR OH. APU VA | UNIT DISASSEMBLED 100% TO CLEAN AND INSPECT P | UNIT RECEIVED DIRTY | |

FIG. 16

| | A | B | C | D | E | F | G | H | I | J |
|---|---|---|---|---|---|---|---|---|---|---|
| 1 | PART_NUM | PART_SERIAL_NUM | SHIP_DT | SN FLAGGED? | | | | | | |
| 2 | 109612-3 | 0001R | 18-NOV-06 | SB - PRODUCT CONVERSION | | | | | | |
| 3 | 109612-3 | 001RU | 17-AUG-07 | SB - PRODUCT CONVERSION | | | | | | |
| 4 | 109612-3 | 1224 | 06-DEC-02 | SB - PRODUCT CONVERSION | | | SUMMARY | COUNT | REMARKS | |
| 5 | 109612-3 | 1230 | 14-SEP-02 | SB - PRODUCT CONVERSION | | | NUMBER OF PRODUCTS CONVERSION BY REPAIR DUE TO SB | 282 | A TOTAL OF 428 UNITS REPORTED TO SHOP TILL DATE | |
| 6 | 109612-3 | 1237 | 07-NOV-03 | SB - PRODUCT CONVERSION | | | NUMBER OF PRODUCTS ENTERED NEW DUE TO SB | 12 | ONLY 4 UNITS REPORTED BACK TO SHOP | |
| 7 | 109612-3 | 1250 | 06-DEC-05 | SB - PRODUCT CONVERSION | | | | | | |
| 8 | 109612-3 | 1253 | 11-AUG-05 | SB - PRODUCT CONVERSION | | | TOTAL PRODUCTS IN SERVICE WITH SB INCORPORATION | 294 | | |
| 9 | 109612-3 | 1259 | 21-MAR-06 | SB - PRODUCT CONVERSION | | | | | | |
| 10 | 109612-3 | 1260 | 16-AUG-03 | SB - PRODUCT CONVERSION | | | | | | |
| 11 | 109612-3 | 1262 | 29-OCT-02 | SB - PRODUCT CONVERSION | | | | | | |
| 12 | 109612-3 | 1263 | 09-FEB-06 | SB - PRODUCT CONVERSION | | | | | | |
| 13 | 109612-3 | 1264 | 15-JUL-03 | SB - PRODUCT CONVERSION | | | | | | |
| 14 | 109612-3 | 1266 | 10-SEP-03 | SB - PRODUCT CONVERSION | | | | | | |
| 15 | 109612-3 | 1268 | 07-FEB-05 | SB - PRODUCT CONVERSION | | | | | | |
| 16 | 109612-3 | 1273 | 07-OCT-05 | SB - PRODUCT CONVERSION | | | | | | |
| 17 | 109612-3 | 1284 | 23-OCT-06 | SB - PRODUCT CONVERSION | | | | | | |
| 18 | 109612-3 | 1291 | 13-OCT-04 | SB - PRODUCT CONVERSION | | | | | | |
| 19 | 109612-3 | 1294 | 21-JUL-03 | SB - PRODUCT CONVERSION | | | | | | |
| 20 | 109612-3 | 1299 | 20-FEB-04 | SB - PRODUCT CONVERSION | | | | | | |
| 21 | 109612-3 | 1300 | 11-FEB-03 | SB - PRODUCT CONVERSION | | | | | | |
| 22 | 109612-3 | 1308 | 26-OCT-02 | SB - PRODUCT CONVERSION | | | | | | |
| 23 | 109612-3 | 1312 | 23-JUL-03 | SB - PRODUCT CONVERSION | | | | | | |
| 24 | 109612-3 | 1315 | 11-DEC-02 | SB - PRODUCT CONVERSION | | | | | | |
| 25 | 109612-3 | 1321 | 03-NOV-06 | SB - PRODUCT CONVERSION | | | | | | |
| 26 | 109612-3 | 1323 | 10-SEP-03 | SB - PRODUCT CONVERSION | | | | | | |
| 27 | 109612-3 | 1324 | 28-JUL-05 | SB - PRODUCT CONVERSION | | | | | | |
| 28 | 109612-3 | 1325 | 07-SEP-05 | SB - PRODUCT CONVERSION | | | | | | |
| 29 | 109612-3 | 1334 | 29-JAN-05 | SB - PRODUCT CONVERSION | | | | | | |
| 30 | 109612-3 | 1335 | 16-JUL-03 | SB - PRODUCT CONVERSION | | | | | | |

*FIG. 17*

PRODUCT FIX-EFFECTIVENESS TRACKING AND NOTIFICATION SYSTEM AND METHOD

TECHNICAL FIELD

The present invention generally relates to product fix-effectiveness tracking, and more particularly to a system and method for tracking products into which a modification has been incorporated, and for notifying personnel regarding the effectiveness of the modification.

BACKGROUND

At times, various products and systems may exhibit a repeated problem or issue. In such instances, a product modification may be formulated and then mandated via a notification. For example, in the aerospace industry notifications known as service bulletins are issued. There are times that a problem that has been addressed by a modification may persist, or when a new problem manifests itself after product modification. Currently, product reliability engineers tracking the effectiveness of such product modifications using manual processes. These processes include tracking configuration and accounting details, and searching for product return attributes that may indicate the ineffectiveness of a modification.

The manual processes that are used to track the effectiveness of product modifications rely on manual efforts to collect data, analyze the collected data, and interpret collected data. This can increase the chances of a delayed response to the potential ineffectiveness of a modification, which can in turn lead to end-user dissatisfaction. These manual processes are also reactive in nature, rather than proactive, which would be preferred. Moreover, the manual processes may not be conducted in real-time, and there is no method in place to automatically alert one or more users of the potential ineffectiveness of a product modification.

Hence, there is a need for a system and method for determining and tracking products into which a modification has been incorporated, and for automatically notifying personnel regarding the potential ineffectiveness of such a modification.

BRIEF SUMMARY

In one embodiment, and by way of example only, a method of tracking the effectiveness of a product modification includes incorporating a modification into a product in response to an issued modification notice. At a user-selected periodicity, periodically accessing removal data that are associated with the product into which the modification was incorporated and are stored in a product removal database. One or more user-selected fix-effectiveness algorithms are executed to determine if at least a portion of the periodically accessed removal data matches one or more user-specified keywords that correlate to the modification. An alert is transmitted to a preset destination if it is determined that at least a portion of the periodically accessed removal data matches the one or more user-specified keywords.

In another exemplary embodiment, a system for tracking the effectiveness of a modification includes a product removal database and a processor. The product removal database has removal data stored therein that are associated with the product into which the modification was incorporated. The processor is in operable communication with the display device and the product removal database, and is configured to periodically access, at a user-selected periodicity, removal data that are stored in the product removal database and ae associated with a product into which the modification was incorporated. The processor is also configured to execute one or more user-selected fix-effectiveness algorithms to determine if at least a portion of the periodically accessed removal data matches one or more user-specified keywords that correlate to the modification, and to transmit an alert to a preset destination if it is determined that at least a portion of the periodically accessed removal data matches the one or more user-specified keywords.

Furthermore, other desirable features and characteristics of the disclosed system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

Figure 13:
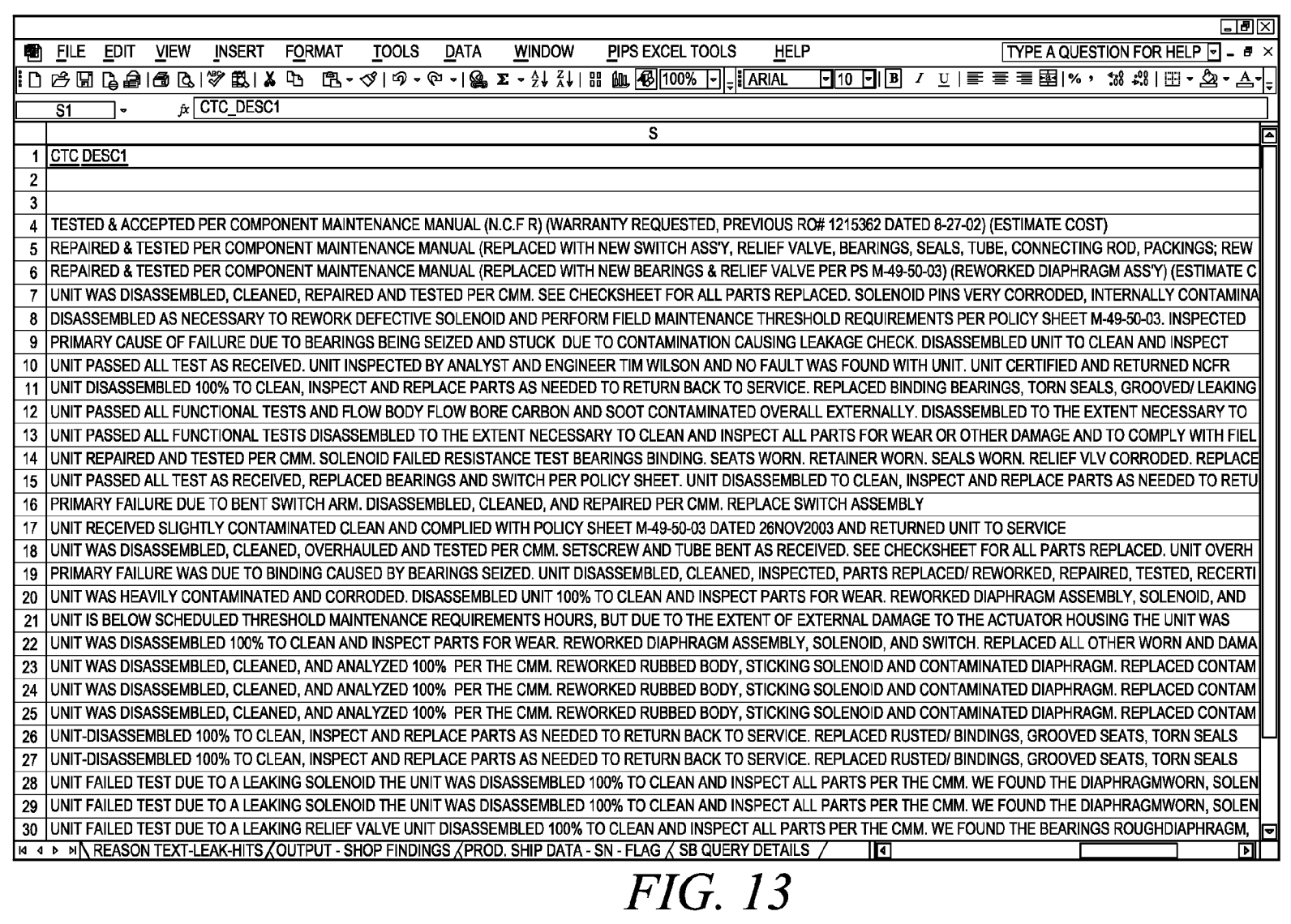

FIGS. 11-17 depict various report charts that may be generated by the system of FIG. 1 when implementing the process of FIG. 2.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
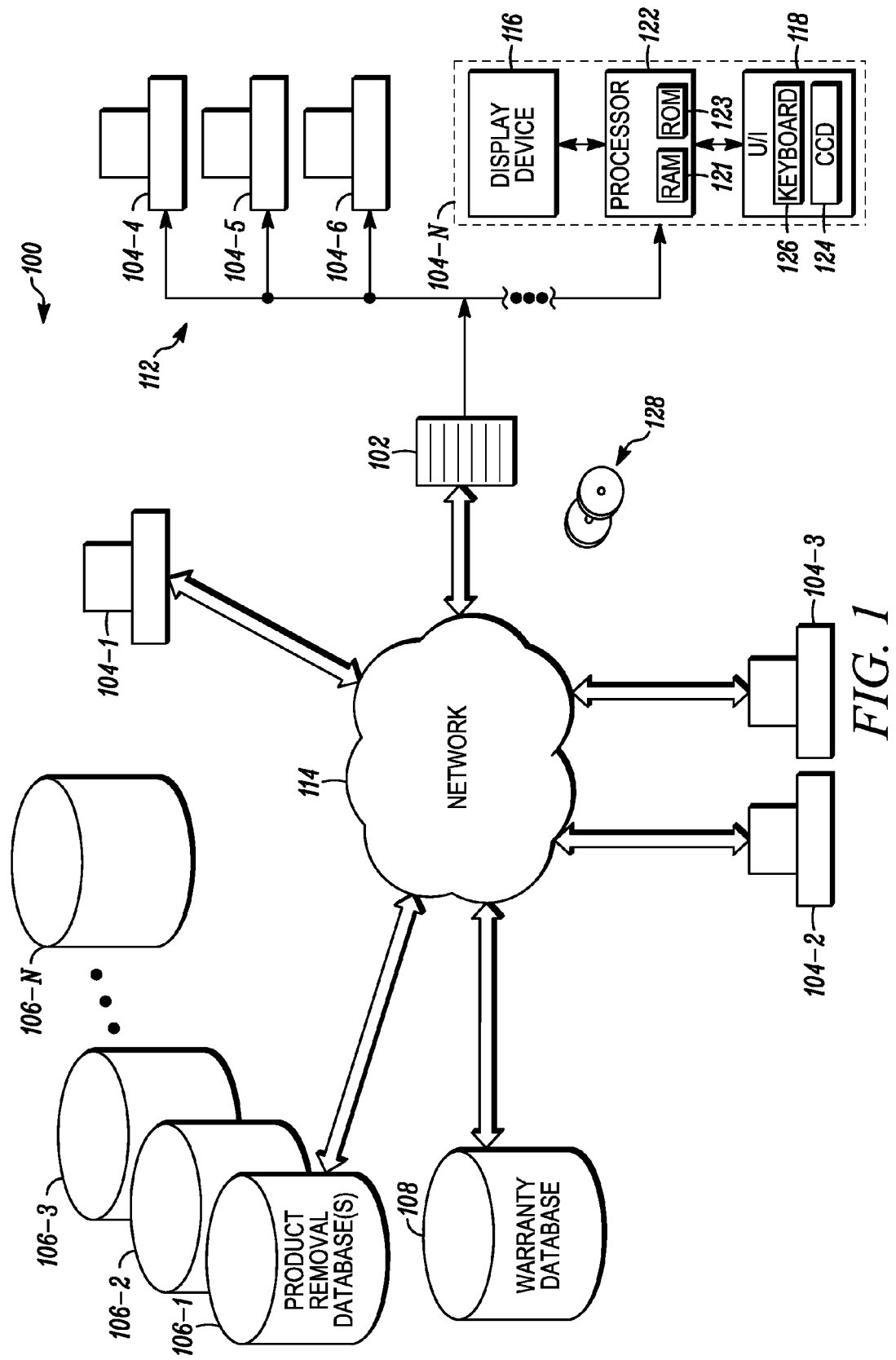
FIG. 1 is a functional block diagram of a system that may be used to implement embodiments of the present invention.

A product reliability tracking and notification system 100 that may be used to implement product reliability tracking and notification methodologies described herein is depicted in FIG. 1, and includes one or more server computer 102, a plurality of user computers 104 (e.g., 104-1, 104-2, 104-3, . . . 104-N), one or more product removal database 106 (e.g., 106-1, 106-2, 106-3, . . . 106-N), and one or more warranty databases 108 (only one shown). In the depicted embodiment, only a single server computer 102 is depicted. It will be appreciated that this is done merely for clarity, and that the system 100 could be implemented with a plurality of server computers 102. It will additionally be appreciated that if the system 100 is implemented with a plurality of server computers 102, each of the server computers 102 could be collocated, or one or more of the server computers 102 could be remotely located from each other. In any case, each server computer 102 has software loaded thereon, or is accessible to software loaded in non-illustrated external memory, that implements at least a portion of the product reliability tracking and notification methodology described further below and that allows each, or at least selected ones, of the user computers 104 to interact with the software to implement at least a portion of this methodology.

The user computers 104 are in operable communication with the server computer 102 either via a local network 112 or a wide area distributed network 114, such as a secure intranet, the Internet, or the World Wide Web. In either case, the user computers 104 are also in operable communication with the product removal databases 106 and the flight-hours database 108, either via the server computer 102 and local network 112 or via the distributed network 114.

Before proceeding further, it is noted that the software that is used to implement the methodology that will be described further below could be installed on individual ones of the user computers 104, if needed or desired. In this regard, it will be appreciated that the system 100 could be implemented without the server computer(s) 102, or that one or more of the user computers 104 could implement the methodology without having to access software on a server computer 102. In any case, for completeness of description, a brief discussion of an exemplary device that may be used to implement a user computer 104 will now be provided.

In the depicted embodiment, each of the user computers 104 includes a display device 116, a user interface 118, and a processor 122. The display device 118 is in operable communication with the processor 122 and, in response to display commands received therefrom, displays various images. It will be appreciated that the display device 116 may be any one of numerous known displays suitable for rendering graphic, icon, and/or textual images in a format viewable by a user. Non-limiting examples of such displays include various cathode ray tube (CRT) displays, and various flat panel displays such as, for example, various types of LCD (liquid crystal display) and TFT (thin film transistor) displays. The display device 116 may additionally be based on a panel mounted display, a head up display (HUD) projection, or any known technology.

The user interface 118 is in operable communication with the processor 122 and is configured to receive input from a user and, in response to the user input, supply various signals to the processor 122. The user interface 118 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 118 includes a CCD 124 and a keyboard 126. A user may use the CCD 124 to, among other things, move a cursor symbol over, and select, various items rendered on the display device 116, and may use the keyboard 122 to, among other things, input various data. A more detailed description of the why a user may select various rendered items with the CCD 124, and the various data that a user may input is provided further below.

The processor 122 is in operable communication with the display device 116 and the user interface 118 via one or more non-illustrated cables and/or busses, and is in operable communication with the server computer 102 via the local area network 112 or the distributed network 114. The processor 122 is configured to be responsive to user input supplied to the user interface 118 to, among other things, selectively interact with the server computer 102, and to command the display device 116 to render various graphical user interface tools, associate data that are input via the user interface 118 with component parts that are also input or selected via the user interface 118, and to set up dynamic alerts for the inputted or selected component parts.

The processor 122 may include one or more microprocessors, each of which may be any one of numerous known general-purpose microprocessors or application specific processors that operate in response to program instructions. In the depicted embodiment, the processor 122 includes on-board RAM (random access memory) 121, and on-board ROM (read only memory) 123. The program instructions that control the processor 122 may be stored in either or both the RAM 121 and the ROM 123, or on a non-illustrated local hard drive. It will be appreciated that this is merely exemplary of one scheme for storing operating system software and software routines, and that various other storage schemes may be implemented. It will also be appreciated that the processor 122 may be implemented using various other circuits, not just one or more programmable processors. For example, digital logic circuits and analog signal processing circuits could also be used.

The product removal databases 106 preferably have various removal data stored therein that are associated with a plurality of products. It will be appreciated that, although the product removal databases 106 are, for clarity and convenience, shown as being stored separate from the main server 102, all or portions of these databases 106 could be loaded onto the main server 102. Moreover, the product removal databases 106, or the data forming portions thereof, could also be part of one or more non-illustrated devices or systems that are physically separate from the depicted system 100. It will additionally be appreciated that the amount and type of data that comprise the product removal databases 106 may vary. Preferably, the product removal databases 106 are configured to include a plurality of data fields associated with each product, which may include customer-supplied data fields. Some non-limiting examples of such data fields include a part number field, a part description field, a part serial number field, a repair facility name field, a component owner/operator name field, a removal type description field, an evaluation result description field, a return type description field, a reason for removal field, time since new, installation dates, and an analyst comments field, just to name a few.

The product warranty database 108 preferably has warranty data stored therein that are associated with a plurality of pre-installed products. As with the product removal databases 106, it will be appreciated that although the warranty database 108 is, for clarity and convenience, shown as being stored separate from the main server 102, all or portions of the database 108 could be loaded onto the main server 102. Additionally, the warranty database 108, or the data forming portions thereof, could also be part of one or more non-illustrated devices or systems that are physically separate from the depicted system 100. It will further be appreciated that the amount and type of data that comprise the warranty database 108 may vary. Preferably, the warranty database 108 is configured to include a plurality of data fields associated with each pre-installed product, which may include customer-supplied data fields. Some non-limiting examples of such data fields include a part number field, a part description field, a part serial number field, a production facility name field, a component owner/operator name field, and a product shipment date field, just to name a few. It is noted that the product shipment date field has data entered therein that is representative of the date on which the specified product was shipped from the production shop to the end-use customer.

The system 100 described above and depicted in FIG. 1 implements a product fix-effectiveness tracking and notification method. More specifically, it implements a method that tracks the effectiveness of improvements (or fixes) that have been incorporated into selected products in response to an issued notice (e.g., a service bulletin). In one embodiment, the system 100 implements a method that selectively executes one or more user-selected fix-effectiveness algorithms, using removal data stored in the product removal database 106, to determine if at least a portion of the removal data matches one or more user-specified keywords that correlate to the modification. If one or more of the user-specified keywords are matched, an alert is transmitted to user-selected ones of the user computers 104.

Figure 2:
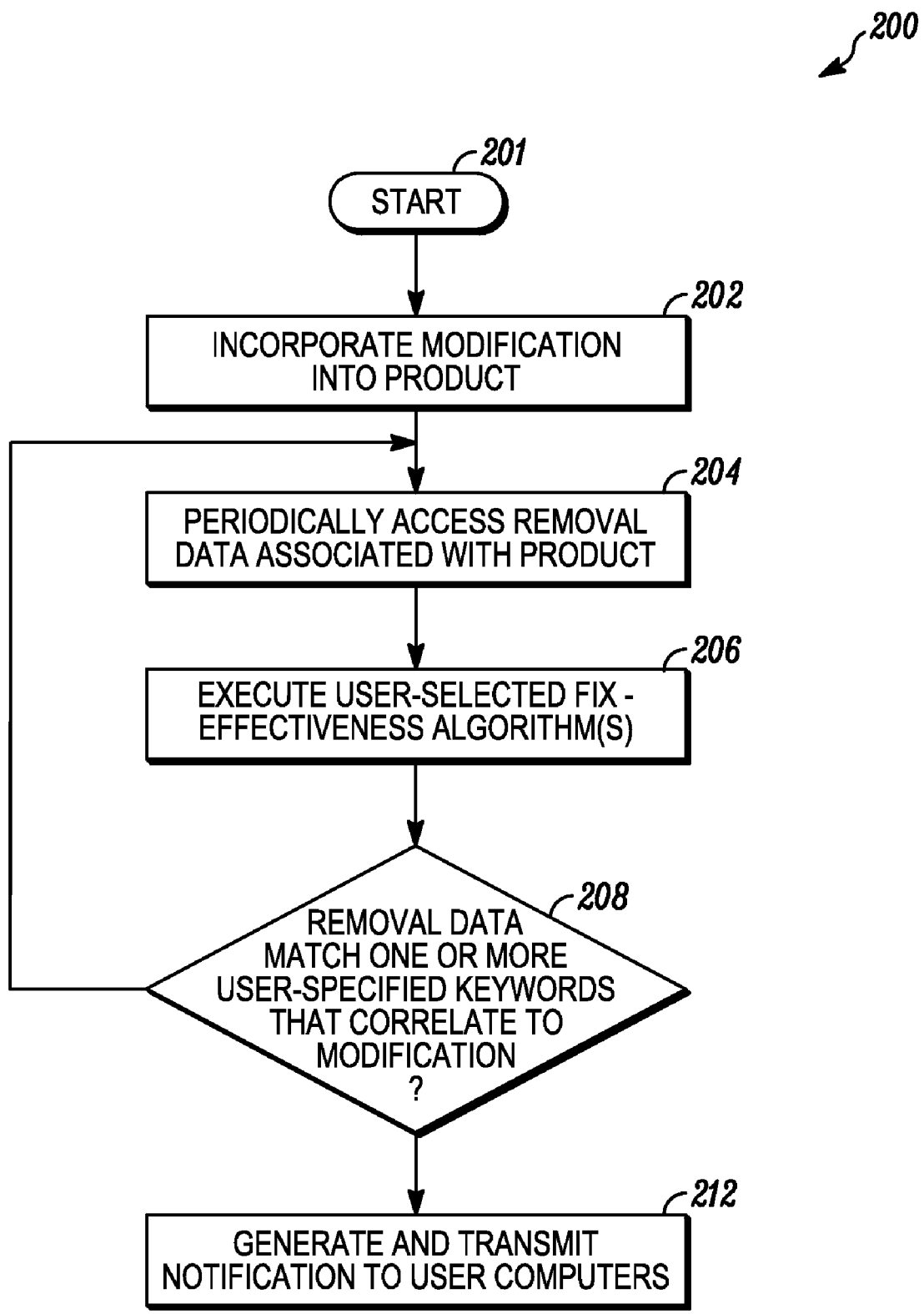
FIG. 2 depicts an exemplary process, in flowchart form, that may be implemented by the exemplary system of FIG. 1.

The overall process 200 by which the system 100 implements this methodology is depicted in flowchart form in FIG. 2, and with reference thereto will now be described in more detail. Before doing so, however, it is noted that the depicted process 200 is merely exemplary of any one of numerous ways of depicting and implementing the overall process to be described. Moreover, the process 200 that is implemented by the system 100 may be a software driven process that is stored, in whole or in part, on one or more computer-readable media, such as the media 128 depicted in FIG. 1. It will additionally be appreciated that the software may be stored, in whole or in part, in one or more non-illustrated memory devices and/or the server computer 102 and/or one or more of the user computers 104. With this background in mind, it is additionally noted that the numerical parenthetical references in the following description refer to like steps in the flowchart depicted in FIG. 2.

The overall process 200 is initiated when a modification is incorporated into a product (202). In the context of this application, the term modification refers to a repair, fix, improvement, or other type of modification to a product that has been formulated to address one or more identified issues, and that has been delineated in an issued notification (e.g., a service bulletin). The server computer 102 (and/or one or more user computers 104) accesses removal data associated with the product via the product removal database 106 (204). Preferably, these removal data are accessed periodically and at a user-selected periodicity.

Upon accessing the removal data, the server computer 102 (and/or one or more user computers 104) executes one or more user-selected fix-effectiveness algorithms (206). A determination is then made as to whether at least a portion of the accessed removal data matches one or more user-specified keywords that correlate to the modification (208). If not, then the process 200 repeats for the same, or a different, product for the next periodicity. If, however, there is a match, the server computer 102 (and/or one or more user computers 104) generates and transmits an alert to one or more preset destinations (212). It will be appreciated that the type of alert that is generated and transmitted may vary, but in a particular preferred embodiment an electronic mail (e-mail) message is sent to one or more preset user e-mail addresses to notify appropriate users of a potential product reliability issue. The server computer 102 (and/or one or more user computers 104) may also automatically or selectively generate one or more reports.

Figure 3:
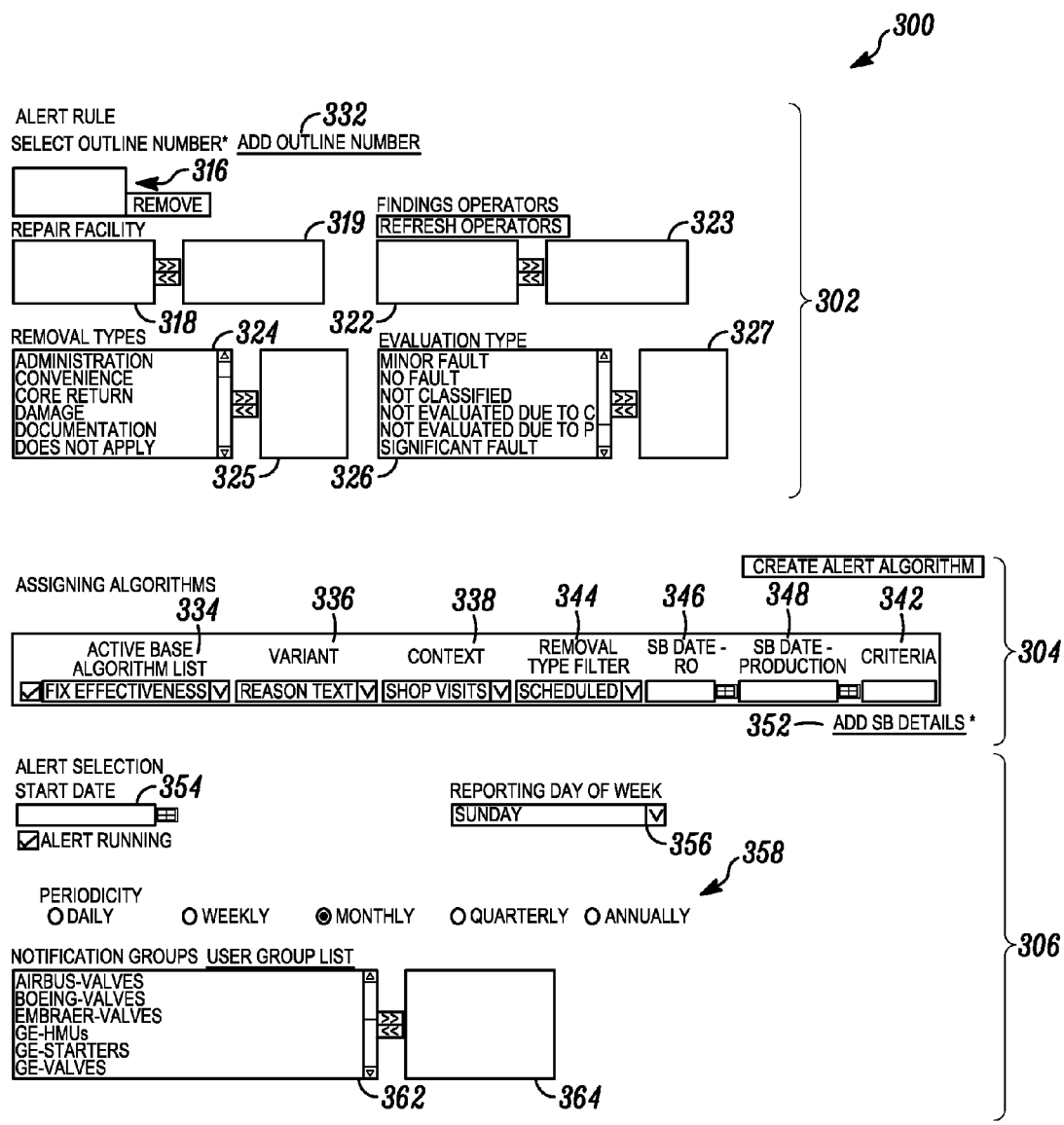
FIG. 3 depicts an exemplary user interface screen that may be displayed to a user for customizing the general process depicted in FIG. 2.

In addition to the above, the system 100 allows a user, via one or more of the user computers 104, to customize the above-described fix-effectiveness tracking and notification method 200 for particular products. For completeness, an exemplary embodiment of this process will now be described. In doing so, reference should initially be made to FIG. 3, which depicts an exemplary screen shot of at least a portion of a user interface screen that is displayed to a user on a user computer display device 116 when an appropriate command is entered, or when an appropriate hyperlink is selected from a separate, non-illustrated user interface page.

The depicted user interface screen 300 includes various sections, with each section including various data entry fields. In the depicted embodiment the user interface screen 300 includes an Alert Rule section 302, an Assigning Algorithms section 304, and an Alert Selection section 306. It will be appreciated that this is merely exemplary of a particular user interface screen 300 configuration, and that in other embodiments the user interface screen 300 may include various other arrangements, numbers, and types of sections. Moreover, some data entry fields associated within some of the sections of the depicted embodiment are not depicted or further described, as these fields are not needed to enable or describe the invention encompassed by the claims.

The Alert Rule section 302 is used to enter product specific data for a particular product of interest. In the depicted embodiment, the Alert Rule section 302 includes at least a Select Outline Number field 316, a Repair Facility field 318, a selected Repair facility field 319, a Findings Operator field 322, a selected Findings Operator field 323, a Removal Type field 324, a selected Removal Type field 325, an Evaluation Type field 326, and a selected Evaluation Type field 327. The Select Outline Number field 316 allows a user to select an outline part number for a product interest. In the depicted embodiment, this may be accomplished by selecting an appropriately titled link 332 (e.g., "Add Outline Number"), which will cause a pop-up window 402, such as the one depicted in FIG. 4, to be rendered on the display device 116. Using the pop-up window 402, the user may enter a base part number, or portion thereof, in a base part number entry field 404. As FIG. 4 additionally depicts, all of the part numbers associated with this base part number are then displayed in a part number field 406. The user may then highlight, using the user interface 118, one or more of the part numbers displayed in the part number field 406, and then select the highlighted part numbers using the user interface 118 and a displayed Add button 408.

Figure 4:
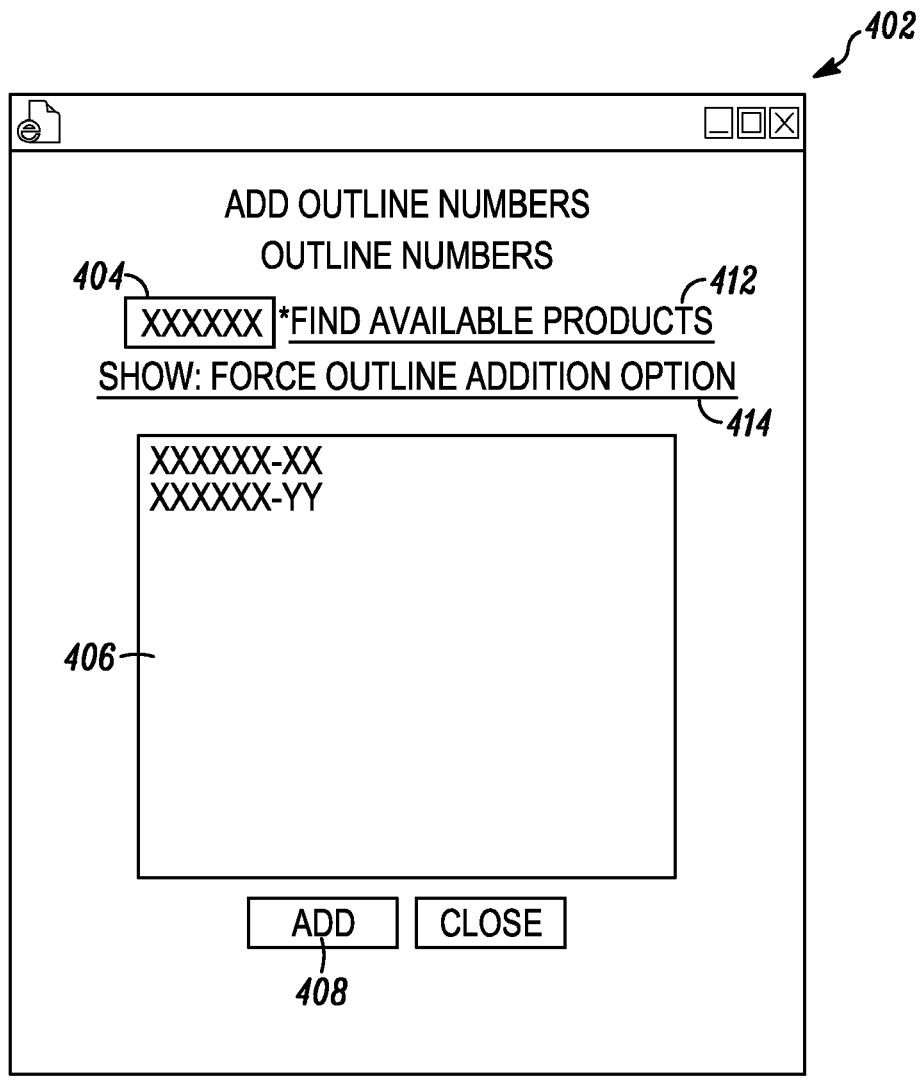
FIGS. 4-10 depict various portions of the exemplary user interface screen of FIG. 3.
Figure 5:
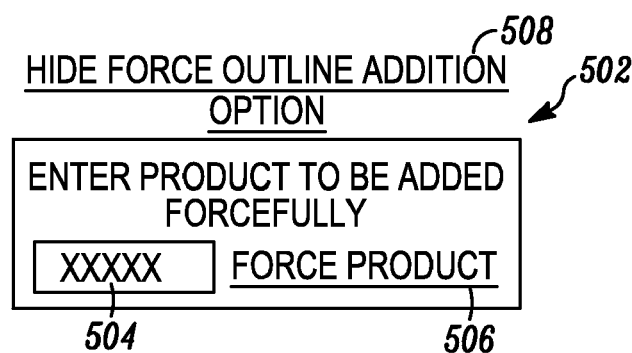

With continued reference to FIG. 4, the depicted pop-up window 402 additionally includes a Find Available Products link 412 and a Force Outline addition option link 414. If the Find Available Products link 412 is selected, a search of a non-illustrated part number database will be conducted using the base part number entered in the base part number entry field 404. All of the part numbers associated with the base part number are then automatically displayed in the part number field 406. If the Force Outline addition option link 414 is selected, another box 502, which is depicted in FIG. 5, is displayed. This box 502 includes an entry field 504 in which a user may enter a part number that is not stored in the part number database (e.g., one of the removal databases 106 and/or the warranty database 108). The user may place the part number that was entered in the entry field 504 into the part number field 406 by selecting a Force Product link 506 using the user interface 118. Thereafter, the box 502 may be hidden by selecting a Hide: Force Outline addition option link 508 using the user interface 118.

Figure 6:
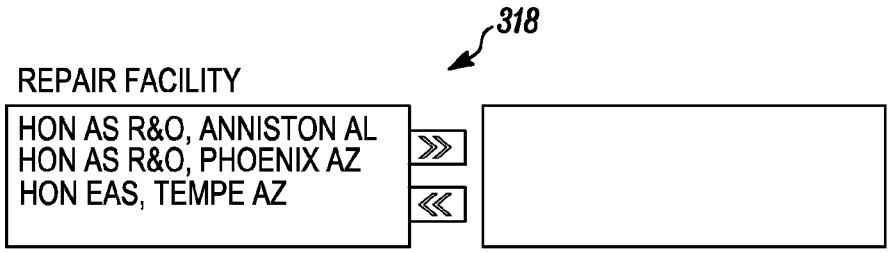

The Repair Facility field 318 allows a user to select one or more facilities where a repair and overhaul action for the selected part number (or numbers) may be carried out. Preferably, and as FIG. 6 depicts, when one or more part numbers are selected, all of the repair facilities for the selected part number (or numbers) are automatically displayed in the Repair Facility field 316. The user may then select one or more of the repair facilities from the displayed list by selecting the double arrow (>>) button using the user interface 118. This will list the selected repair facility(ies) in the Selected repair facilities field 319. The user may also de-select one or more of the repair facilities in the selected Repair Facilities field 319 by highlighting one or more of them and then selecting the backward double arrow (<<) button using the user interface 118. In some embodiments, if the user does not select any of the displayed repair facilities, the system defaults to selecting all of the displayed repair facilities.

Figure 7:
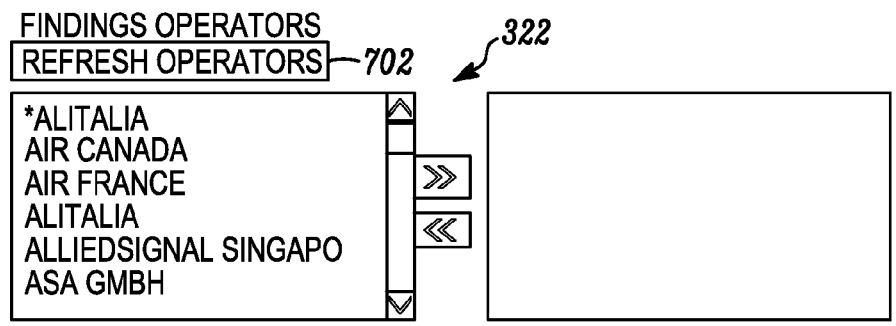

The Findings Operators field 322 is used to indicate the entity (e.g., the operator) that owns the product associated with the selected part number(s). Preferably, and as FIG. 7 depicts, when one or more part numbers are selected, all of the potential operators associated with the selected product are automatically listed in the Findings Operators field 322. The user may then select one or more of the operators from the displayed list by highlighting one or more of the listed operators and selecting the double arrow (>>) button using the user interface 118. This will list the selected operators in the selected Findings Operators facilities field 323. The user may also de-select one or more of the operators in the selected Findings Operators field 323 by highlighting one or more of them and then selecting the backward double arrow (<<) button using the user interface 118. In some embodiments, if the user does not select any of the displayed operators, the system defaults to selecting all of the displayed operators. Moreover, in some embodiments, such as the one depicted in FIG. 7, if a subset of the listed operators is highlighted and selected, the list of operators may be refreshed by selecting a "REFRESH" button 702 using the user interface 118.

Figure 8:
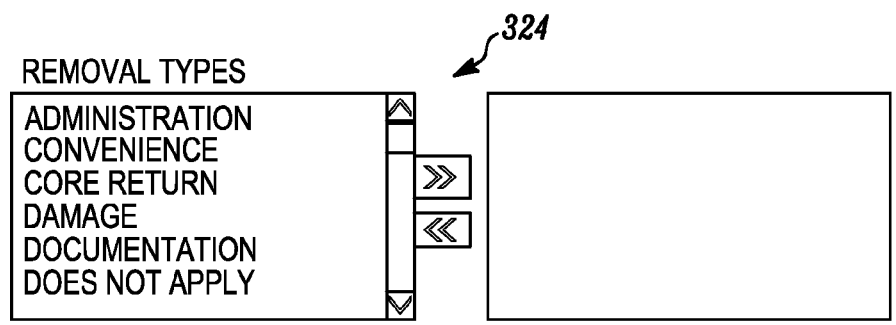

The Removal Type field 324 is used to indicate the reason that the particular part associated with the selected part number was removed from service and shipped to the repair and overhaul facility. Preferably, and as FIG. 8 depicts, when one or more part numbers are selected, a listing of the removal types that a technician (or other repair and overhaul facility personnel) may enter into the removal database are automatically listed in the Removal Type field 324. The user may then select one or more of the removal types from the displayed list by highlighting one or more of the listed operators and selecting the double arrow (>>) button using the user interface 118. This will list the selected removal types in the selected Removal Types field 325. The user may also de-select one or more of the removal types in the selected Removal Types field 325 by highlighting one or more of them and then selecting the backward double arrow (<<) button using the user interface 118. Similar to various other fields, in some embodiments, if the user does not select any of the displayed removal types, the system defaults to selecting all of the removal types. It will be appreciated that the removal types depicted in FIG. 7 are merely exemplary and are additionally only a subset of the removal types that may be included.

Figure 9:
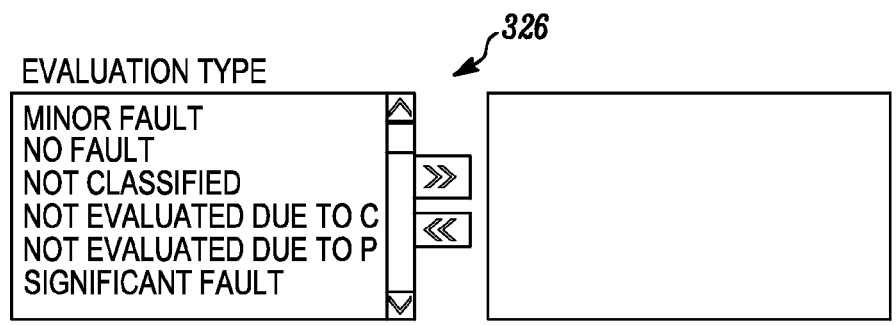

The Evaluation Type data field 326 is used to indicate a high level classification of the outcome of the test/evaluation process conducted on the product associated with the selected part number(s). In particular, this field 326 is used to indicate whether the product associated with the selected part number(s) was evaluated for the existence of a failure and, if so, the relative severity of the evaluation. Preferably, and as FIG. 9 depicts, when one or more part numbers are selected, a listing of the evaluation types that a technician (or other repair and overhaul facility personnel) may enter into the removal database are automatically listed in the Evaluation Type field 326. The user may then select one or more of the evaluation types from the displayed list by highlighting one or more of the listed evaluation types and selecting the double arrow (>>) button using the user interface 118. This will list the selected evaluation types in the selected Evaluation Types field 327. The user may also de-select one or more of the evaluation types in the selected Evaluation Types field 327 by highlighting one or more of them and then selecting the backward double arrow (<<) button using the user interface 118. Similar to various other fields, in some embodiments, if the user does not select any of the displayed removal types, the system defaults to selecting all of the evaluation types. It will be appreciated that the evaluation types depicted in FIG. 7 are merely exemplary and are additionally only a subset of the evaluation types that may be included.

As noted above, the Alert Rule section 302 of the user interface screen 300 may include other data fields. These other data fields, if included, are optional in nature, and are not needed to execute any of the previously mentioned algorithms. As such these will not be further described. Instead, the remaining sections 304, 306 of the user interface screen 300 will now be described.

The Assigning Algorithms section 304 is used to select desired variants of a plurality of algorithms, and to associate particular filter parameters to the selected algorithm variant(s). Although the specific schema for doing so may vary, in the depicted embodiment the Assigning Algorithm section 304 is implemented at least with, what are referred to herein as, an Active Base Algorithm List drop-down field 334, a Variant drop-down field 336, a Context drop-down field 338, and a Criteria drop-down field 342. Moreover, and as FIG. 3 further depicts, when a Fix Effectiveness algorithm is selected using the Active Base Algorithm List drop-down field 334, the Assigning Algorithm section 304 is displayed with what are referred to herein as a Removal Type Filter drop-down field 344, an SB Date-RO dropdown field 346, an SB Date-Production drop-down field 348, and an Add SB Details link 352.

The Active Base Algorithm List drop-down field 334 provides a list of general algorithms that may be implemented for the product associated with the selected part number(s). These algorithms may vary, and may include, for example, mean time between failure (MTBX) algorithms, a Crow-AMSAA estimated beta (β) algorithm, various Pareto trend chart generation algorithms, a general reliability-related keyword search algorithm, and a fix-effectiveness algorithm. The (MTBX) algorithms, the Crow-AMSAA estimated beta (β) algorithm, the Pareto trend chart generation algorithms, and the general reliability-related keyword search algorithm are all described in detail in the previously-referenced U.S. patent application Ser. No. 12/254,668. A detailed description of these algorithms and associated variants is not needed herein to fully describe and enable the instant invention and, as such, will not be provided. A detailed description of the fields that comprise the Assigning Algorithms section 304 for the Fix-Effectiveness algorithm will be provided further below. Before doing so, however, the remaining section displayed on the user interface screen 300 will be described.

Referring once again to FIG. 3, the remaining section displayed on the user interface screen 300 is the Alert Selection section 306. The Alert Selection section 306 includes a Start Date field 354, a Reporting Day of Week field 356, a Periodicity selection field 358, a Notification Groups field 362, and a selected notification groups field 364. The Start Date field 354 is used to set the date from which the analysis will be tracked. The Reporting Day of Week field 356, at least in the depicted embodiment, is implemented as a drop-down field. No matter its specific implementation, however, it allows a user to specify the day of the week that the results of the fix-effectiveness algorithm variant selected in the Assigning Algorithms section 304 will be reported.

The Periodicity selection field 358 allows a user to set the periodicity at which the fix-effectiveness algorithm variant will be conducted. Although the periodicities made available to users may vary from embodiment to embodiment, in the depicted embodiment the periodicities include daily, weekly, monthly, quarterly, and annually. Moreover, the schema that is used to allow users to set a desired periodicity may vary. In the depicted embodiment, the schema is implemented using radio buttons, one each for each of the selectable periodicities.

The Notification Groups field 362 lists potential groups, using predetermined nomenclature, which may be selected to receive an alert when one is generated and transmitted. Preferably, though not necessarily, this field is automatically populated when the part number(s) is(are) selected. In any case, a user may select one or more of the listed groups from the displayed list by highlighting one or more of the listed groups and selecting the double arrow (>>) button using the user interface 118. This will list the selected group(s) in the selected notification groups field 364. The user may also de-select one or more of the groups in the selected notification groups field 364 by highlighting one or more of them and then selecting the backward double arrow (<<) button using the user interface 118.

Having described each of the sections displayed the user interface screen 300, a more detailed description of the fields that comprise the Assigning Algorithms section 304, when the Fix-Effectiveness algorithm is selected in the Active Base Algorithm List drop-down field 334, will now be provided. The Fix-Effectiveness algorithm variants automatically search the product removal database 106 for one or more specified keywords and trigger an alert if the given keyword(s) is(are) found. In the depicted embodiment, the Keyword Search algorithm variants allow multiple keywords to be searched using OR-logic. Hence, if multiple keyword searching is desired, an "OR" should be placed between each keyword.

Figure 10:
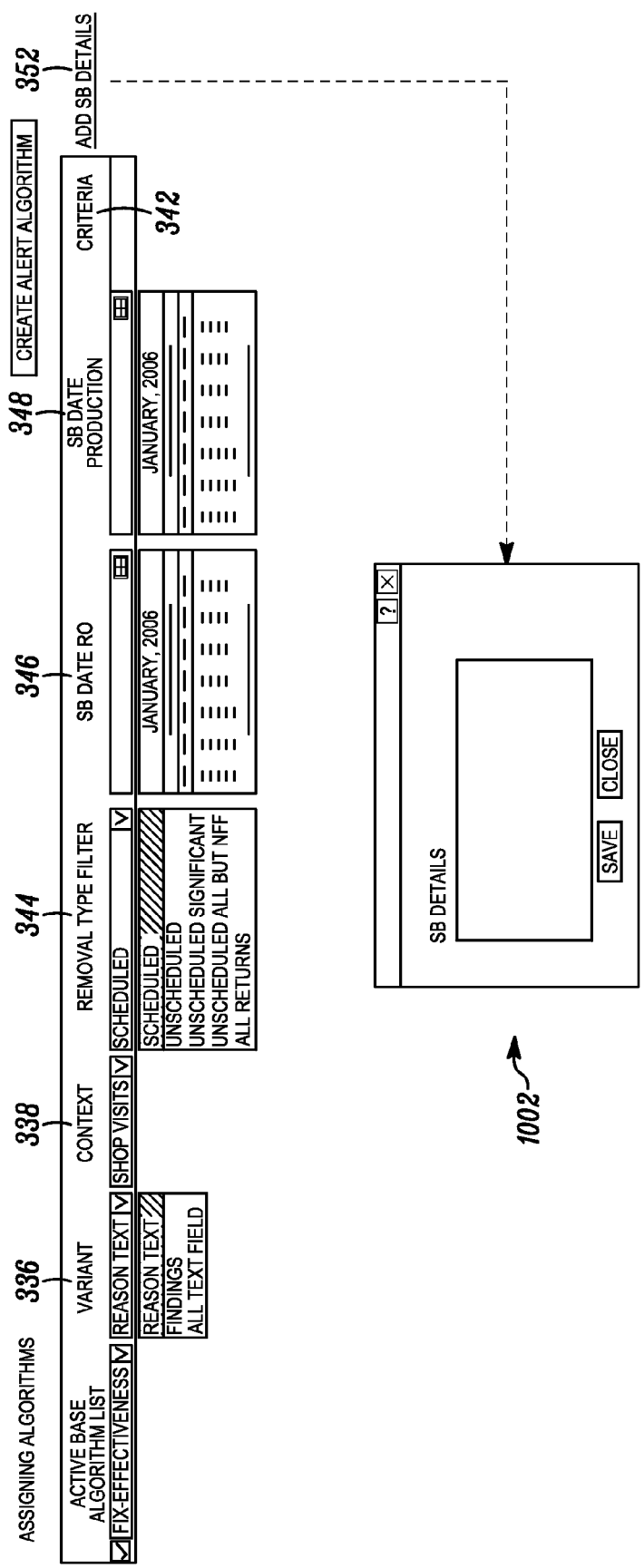

As FIG. 10 depicts, there are three selectable variants of the Fix-Effectiveness algorithm, which are automatically displayable in the Variant drop-down field 336 when the Fix-Effectiveness algorithm is selected in the Active Base Algorithm List field 334. Each of these algorithm variants in turn have variants, based on selections made in the Removal Type Filter field 344. The Fix-Effectiveness algorithm variants include a "Reason Text" variant, a "Findings" variant, and an "All text field" variant.

The Context drop-down field 338, for all of the Fix-Effectiveness algorithm variants, is always the same. This is because the context is shipments of the product associated with the selected part number(s) to a repair and overhaul facility. In the depicted embodiment, this context is referenced using the nomenclature "Shop Visits."

The Removal Type Filter drop-down field 344 allows the user to select a specific removal type classification for which the algorithm variant will filter the product removal database 106. The removal type classifications that may be selected correspond to data entries made in the product removal database 106 by analysts/technicians at the repair and overhaul facility. It will be appreciated that these classifications may be varied and tailored to specific end-users of the system, but in the depicted embodiment the classifications include scheduled removals (Scheduled), unscheduled removals (Unscheduled), unscheduled removals with a significant fault found during testing (Unscheduled Significant), all unscheduled removals except for those in which no fault was found (Unscheduled All but NFF), and all removal types (All returns).

The Criteria field 342 allows a user to enter one or more keywords for which the product removal database 106 will be searched. A single keyword or multiple keywords may be entered into the Criteria field 342. If more than one keyword is entered, an "or" should be placed between each keyword. For all of the Fix-Effectiveness algorithm variants, one or more data fields in the product removal database 106 are searched for one or more keywords that a user has entered into the Criteria field 342. As will be described momentarily, the one or more data fields that are searched will vary with the selected Fix-Effectiveness algorithm variant.

The SB Date-RO drop-down field 346 and the SB Date-Production drop-down filed 348 each allow a user to enter the date when a modification delineated in an issued notification was incorporated. The difference is that the SB Date-RO drop-down field 346 is used to enter the date when the modification was incorporated on in-service products in, for example, a repair and overhaul facility, whereas the SB Date-Production drop-down field 348 is used to enter the date when the modification was incorporated on products during production. Thus, all products in which a particular modification was incorporated are flagged if: (1) it was shipped from a repair and overhaul facility after the date specified in the SB Date-RO drop-down field 346 or (2) it was shipped from the production facility after the date specified in the SB Date-Production drop-down field 348. It is noted that the dates products are shipped from a repair and overhaul facility are stored in the product removal databases 106, and the dates products are shipped from a production facility are stored in the warranty database 108.

The Add SB Details link 352 allows a user to enter details regarding a specific modification. To do so, it is seen that when the Add SB Details link 352 is selected a pop-up window 1002 is rendered on the display device. Using the pop-up window 1002, the user may enter and save details regarding a specific modification, and then close the pop-up window 1002. The details that are entered may vary, but preferably include data related to the modification pertaining to problem, background, action, benefits, revision of the part number, and instructions for carrying out the modification.

As was noted above, the fix-effectiveness algorithm searches one or more data fields in the product removal database 106, for one or more keywords that a user has entered into the Criteria field 342, in dependence upon the selected Fix-Effectiveness algorithm variant. For example, if the Reason Text variant is selected, then for each product that has been flagged the Fix-Effectiveness algorithm searches data fields in the product removal database 106 in which analysts/technicians enter reasons for removing a product from its end-use system. If the Findings variant is selected, then for each product that has been flagged the Fix-Effectiveness algorithm searches data fields in the product removal database 106 in which analysts/technicians enter comments relative to what was done to the product to restore serviceability are searched. If the All text field variant is selected, then for each product that has been flagged the Fix-Effectiveness algorithm searches all of the data fields in the product removal database 106. For each of these variants, if the specific keyword(s) entered into the Criteria field 342 match the one or more data fields in the product removal database 106 that are searched, then an alert is generated and transmitted.

In addition to selectively generating and transmitting alerts to user-specified destinations/personnel, the system 100 may also selectively generate reports. It will be appreciated that the form and content of the reports that are generated may vary, and the form and content may depend, at least in part, on the selected Fix-Effectiveness algorithm variant. At least a portion of some exemplary reports that may be generated, which in the depicted embodiment are generated in spreadsheet form, are depicted in FIGS. 11-17 and are readily labeled to indicate the specific type of information that may be reported.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of tracking the effectiveness of a product modification that has been incorporated into a product in response to an issued modification notice, the method comprising the steps of:
   periodically accessing, via a computer and at a user-selected periodicity, removal data stored in a product removal database that is in operable communication with the computer, the removal data associated with the product into which the modification was incorporated;
   executing one or more user-selected fix-effectiveness algorithms on the computer to determine if at least a portion of the periodically accessed removal data matches one or more user-specified keywords that correlate to the modification; and
   transmitting an alert from the computer to a preset destination if it is determined that at least a portion of the periodically accessed removal data matches the one or more user-specified keywords,
   wherein:
   the user-selected periodicity is selected from a plurality of user-selectable periodicities that were rendered on a display by the computer, and
   the one or more user-selected fix-effectiveness algorithms are selected from a plurality of user-selectable algorithms that were rendered on the display by the computer.

2. The method of claim 1, wherein:
   the step of transmitting an alert comprises generating and transmitting an electronic mail (e-mail) message to the preset destination; and
   the preset destination comprises a preset e-mail address.

3. The method of claim 2, further comprising:
   generating and transmitting the e-mail message to a plurality of preset e-mail addresses.

4. The method of claim 1, further comprising:
   rendering, on the display, a graphical user interface (GUI) that includes a plurality of user interface fields for receiving input data from a user via a user interface device.

5. A system for tracking product reliability, comprising:
   a display configured to at least selectively render a plurality of user-selectable periodicities and a plurality of user selectable fix-effectiveness algorithms;
   a product removal database having removal data stored therein, the removal data associated with a product; and
   a processor in operable communication with the display device and the product removal database, the processor configured to:
   periodically access, at a user-selected periodicity that was selected from the plurality of user-selectable periodicities rendered on the display, removal data stored in the product removal database, the removal data associated with a product into which a modification was incorporated,
   execute one or more user-selected fix-effectiveness algorithms selected from the plurality of user-selectable fix-effectiveness algorithms rendered on the display to determine if at least a portion of the periodically accessed removal data matches one or more user-specified keywords that correlate to the modification, and
   transmit an alert to a preset destination if it is determined that at least a portion of the periodically accessed removal data matches the one or more user-specified keywords.

6. The system of claim 5, wherein the processor is further configured to automatically generate one or more reliability-related reports for the product line if the criterion for the user-specified reliability parameter is not met.

7. The system of claim 5, further comprising wherein:
   the processor is further configured to supply image rendering display commands to the display device that cause the display device to render images representative of at least portions of the one or more reliability-related reports.

8. The system of claim 5, wherein:
   the preset destination is a preset electronic mail (e-mail) address; and
   the processor is further configured to generate and transmit an e-mail message to the preset e-mail address.

* * * * *